United States Patent [19]

Glatthorn

[11] 4,329,769
[45] May 18, 1982

[54] APPARATUS FOR WORKING ON TUBESHEETS

[75] Inventor: Raymond H. Glatthorn, St. Petersburg, Fla.

[73] Assignee: Westinghouse Electric Corp., Pittsburgh, Pa.

[21] Appl. No.: 100,678

[22] Filed: Dec. 5, 1979

[51] Int. Cl.³ .......................................... B23Q 3/157
[52] U.S. Cl. .................................. 29/568; 29/26 B; 29/726; 29/727; 408/35; 414/746
[58] Field of Search ............... 29/726, 727, 26 B, 568; 414/4, 746, 5, 728, 8; 408/234, 236, 237, 238, 111

[56] References Cited

U.S. PATENT DOCUMENTS

| | | | |
|---|---|---|---|
| 736,684 | 8/1903 | Cain | 29/727 |
| 2,013,933 | 9/1935 | Wagner | 29/726 |
| 2,669,135 | 2/1954 | Moore | 408/234 X |
| 3,234,977 | 2/1966 | Byers | 408/23 X |
| 3,762,036 | 10/1973 | Goebel et al. | 408/35 X |
| 3,935,951 | 2/1976 | Claus et al. | 414/746 |
| 3,981,605 | 9/1976 | Wirsing | 408/234 X |
| 4,004,698 | 1/1977 | Gebelin | 414/4 |
| 4,038,739 | 8/1977 | Nohejl | 408/35 X |
| 4,148,403 | 4/1979 | Riffe | 414/4 X |
| 4,178,787 | 12/1979 | Gerkey | 29/727 |
| 4,200,424 | 4/1980 | Gerkey et al. | 29/726 X |
| 4,216,893 | 8/1980 | Glatthorn | 29/726 X |
| 4,231,690 | 11/1980 | Burns | 408/111 X |

Primary Examiner—William R. Briggs
Attorney, Agent, or Firm—F. J. Baehr, Jr.

[57] ABSTRACT

A remotely controlled tool for working inside a steam generator hemispherical head on tubes and tube holes and moving along orthogonal x and y axes to conform to the tube layout pattern in the tubesheet.

8 Claims, 3 Drawing Figures

APPARATUS FOR WORKING ON TUBESHEETS

BACKGROUND OF THE INVENTION

This invention relates to nuclear steam generators and more particularly to an apparatus which moves along the same orthogonal x and y axes as those of the rows of tubes in order to remotely work on the holes and tubes disposed in the tubesheet of the steam generator.

In pressurized water nuclear reactors the primary fluid or coolant is pumped through a reactor and a steam generator. Radioactive contaminants in the primary fluid are deposited on the tubes and in the channel head so that repair crews are subjected to significant radioactivity when required to perform work within the channel head. Thus, it is desirable to provide an apparatus which can be remotely operated and moves along the same orthogonal axes as the rows of tubes.

SUMMARY OF THE INVENTION

In general, apparatus for remotely working on tubes and holes in a tubesheet of a steam generator channel head, when made in accordance with this invention, comprises a first set of rails affixed to the head so as to be generally parallel to the tubesheet, and a second set of parallel rails disposed between the tubesheet and the first set of parallel rails. The second set of rails are generally parallel to the tubesheet and slidably disposed on the first set of rails. A carriage is slidably disposed on the second set of rails. A tool holding and driving head is pivotally mounted on the carriage. The apparatus also comprises means for moving the carriage longitudinally along the second set of rails and means for moving the second set of rails longitudinally along the first set of rails and means for rotating the tool and for advancing it into the hole disposed in the tool holding and driving head, whereby the tool can operate on every tube and hole in the tubesheet.

BRIEF DESCRIPTION OF THE DRAWINGS

The objects and advantages of this invention will become more apparent by reading the following detail description in connection with the accompanying drawings, in which.

DESCRIPTION OF THE PREFERRED EMBODIMENT

Figure 1:
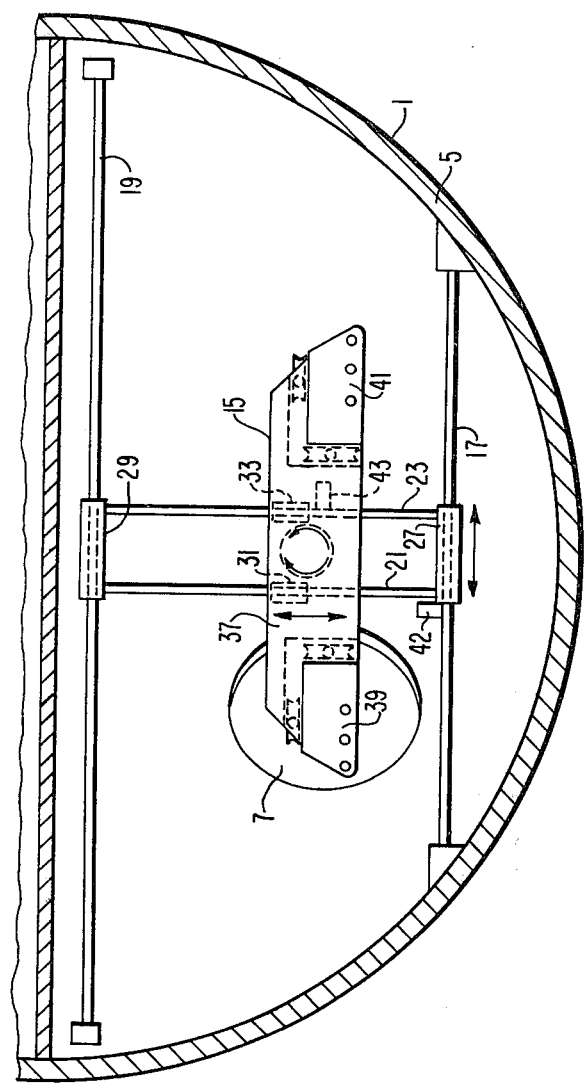
FIG. 1 is a partial sectional view of a steam generator head containing apparatus made in accordance with this invention disposed therein.
Figure 2:
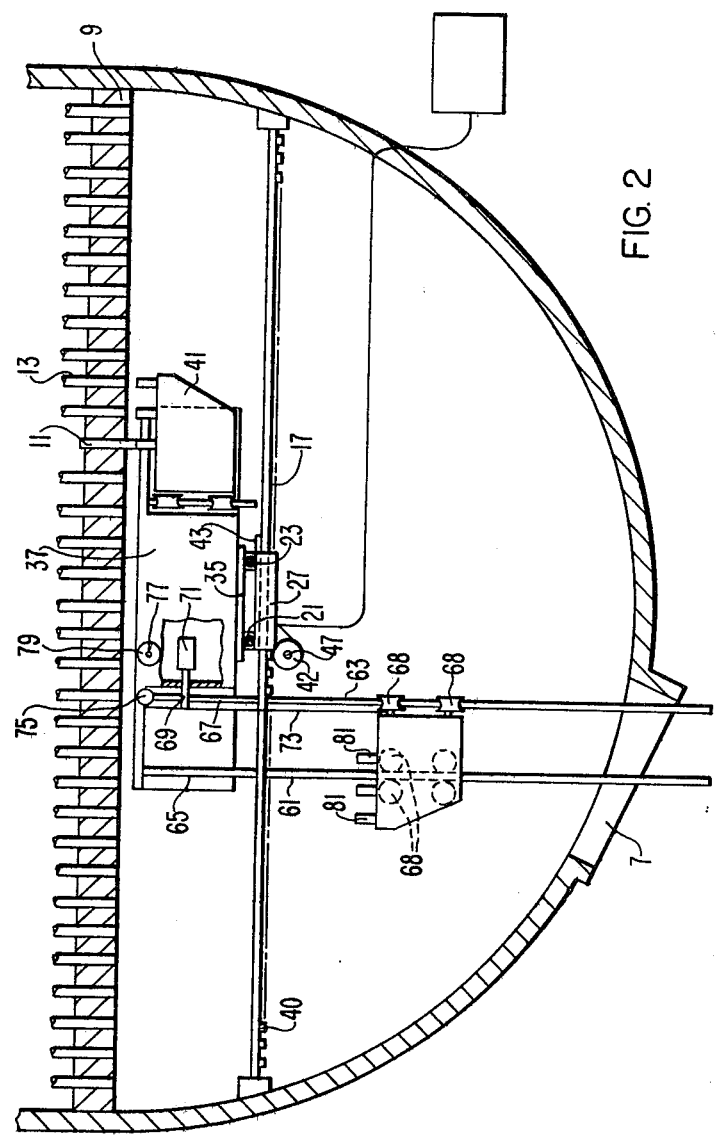
FIG. 2 is a partial sectional view of the steam generator head with the apparatus therein.
Figure 3:
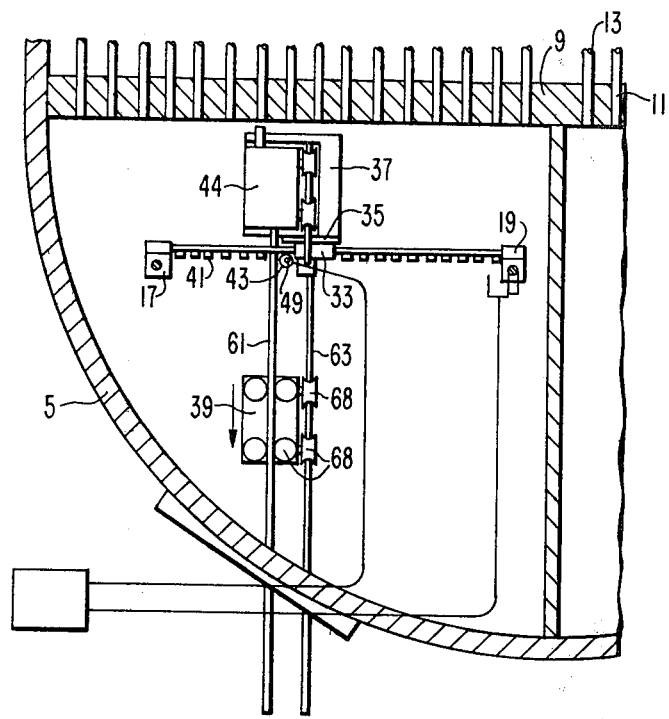
FIG. 3 is a partial sectional view of the steam generator with a tool holding and driving head being passed through a manway.

Referring now to the drawings in detail and in particular to FIGS. 1 through 3 there is shown a portion of a channel head 1 of a steam generator. The channel head 1 has hemispherical walls 5 with a manway 7 disposed therein, and a tubesheet 9 with a plurality of holes 11 which receive ends of tubes 13. The holes 11 are disposed on a square pitch so that the rows of tubes are laid out on x and y orthogonal axes.

Apparatus 15 for remotely working on the tubes 13 and holes 11 in the tubesheet 9 of a steam generator and designed to move along orthogonal x and y axes comprises a first set of generally parallel, spaced apart, ways, bars or rails 17 and 19 which have their ends affixed to the wall 5 of the channel head 1 and are disposed generally parallel to the tubesheet 9 and a second set of generally parallel ways, bars or rails 21 and 23 disposed between the tubesheet 9 and the first set of rails 17 and 19.

Sleeve or some type of anti-friction bearings 27 and 29 are slidably disposed on the first set of rails 17 and 19, respectively. The ends of the second set of rails 21 and 23 are affixed to the bearings 27 and 29 so that the second set of rails 21 and 23 are slidably disposed on the first set of rails 17 and 19 to move longitudinally with respect to the first set of rails 17 and 19. Sleeve or some type of anti-friction slidable bearings 31 and 33 are slidably disposed on the second set of rails 21 and 23 and a carriage 35 is affixed to the bearings 31 and 33 so that the carriage 35 is slidably disposed on the second set of rails 21 and 23 so that the carriage moves longitudinally with respect to the second set of rails 21 and 23.

A turret 37 is pivotally disposed on the carriage 35 and tool holder and driving means 39 and 44 are disposed on opposite ends of the turret 37. To provide controlled longitudinal movement of the carriage 35 in x and y directions along orthogonal axes one rail in each set of rails has a rack 40 and 41 disposed on the underside of the rails 17 and 21, respectively, and servo drive means 42 and 43 with pinion gears 47 and 49, respectively, which engages racks 40 and 41. The servo drive means 42 and 43 also have disposed therein feedback means to indicate the position of the drive with respect to the rails. A controller 53 is connected to the drive means 43 and 45 so that they may be operated remotely and to give a numeric indication of their position at all times. It being understood that the drive means described herein exemplary and other drive means with feedback and position indication could be utilized to move the second set of rails and carriage.

The turret 37 has a drive means which rotates the turret 37 with respect to the carriage 35 and a solenoid actuated pin 59 which registers with holes spaced at 90° intervals to provide accurate location of the turret 37 so that when the pin 59 is disposed in one of the holes the turret 37 is aligned with the x or y orthogonal axes and a row of tubes.

As shown in FIGS. 2 and 3, the tool driving and holding means 39 and 44 are detachably disposed on opposite ends of the turret 37. Detachable rails 61 and 63 attach to rails 65 and 67 affixed to the turret 37 and guide roller 68 disposed on the tool holding and driving means 39 and 44 allow the tool holding and driving means to roll along the rails 61 and 63 so that it is moved in and out of the manway 7 to change tools, when a latch 69 in the turret 37 is retracted by a cylinder 71. A cable 73, pulley 75, drive motor 77 and drum 79 cooperate to remotely lower and raise the tool holder and driving means 39.

The tool holder and driving means 39 and 44 have a plurality of tools 81 disposed in a row, each tool may do the same job or they can do serial jobs such as drilling and reaming or multiples of the same tool could be used one at a time in order to reduce the time necessary to replace tools as they become dull or defective.

The distal ends of the tool holder and driving means 39 and 44 form acute angles in both the horizontal and vertical planes allowing the tool mounted on the ends of the tool holding and driving means 39 and 44 to fit in the holes 9 adjacent the channel head 1 and to allow the apparatus to work on every hole 9 in the tubesheet 9 when the turret 37 is in one of its four b 90° positions.

What is claimed is:

1. Apparatus for remotely working on tubes and holes in a tubesheet of a steam generator head, said apparatus comprising:

a first set of rails affixed to said head so as to be generally parallel to said tubesheet;

a second set of rails disposed between said tubesheet and said first set of rails and generally parallel to said tubesheet;

said second set of rails being slidably disposed on said first set of rails;

a carriage slidably disposed on said second set of rails;

a turret pivotally mounted on said carriage and having a tool holding and driving means detachably mounted on at least one end of said turret;

means for moving said carriage longitudinally along said second set of rails;

means for moving said second set of rails longitudinally along said first set of rails;

means for rotating said turret with respect to said carriage;

at least one tool mounted on said tool holding and driving means;

means for rotating said tool and for advancing it into a tube hole being disposed in said tool holding and driving means;

a pair of rods detachably connected to said turret and slidably attached to said tool driving and holding means;

means for releasing said tool driving and holding means from said turret; and means for moving said tool driving and holding means along said pair of rods to facilitate changing said tool in said tool driving and holding means;

whereby said tool can operate on every tube hole in the tubesheet.

2. Apparatus as set forth in claim 1, wherein the rails are round bars.

3. Apparatus as set forth in claim 1 and further comprising a tool holding and driving means detachably mounted on each end of said turret.

4. Apparatus as set forth in claim 1, wherein the tool holding and driving means has a plurality of tools disposed thereon.

5. Apparatus as set forth in claim 4, wherein the tools are aligned in a row and spaced on the same pitch as the tubes in a row.

6. Apparatus as set forth in claim 5, wherein the tools are disposed adjacent one margin of the tool driving and holding means.

7. Apparatus as set forth in claim 1, wherein the distal end of the tool driving and holding means form an acute angle in two cross-sectional planes.

8. Apparatus as set forth in claim 7, wherein the planes are normal to each other.

* * * * *